(12) United States Patent
Kanashima et al.

(10) Patent No.: US 11,440,022 B2
(45) Date of Patent: Sep. 13, 2022

(54) EGGSHELL MEMBRANE SEPARATION SYSTEM AND EGGSHELL MEMBRANE SEPARATION METHOD

(71) Applicants: BIOAPATITE, K.K., Hikone (JP); ADVANTEC CO., LTD., Tokyo (JP); TRESSBIO, LLC., Hikone (JP)

(72) Inventors: Keinosuke Kanashima, Hikone (JP); Koichi Nakamura, Hikone (JP); Suguru Karita, Tokyo (JP)

(73) Assignees: BIOAPATITE, K.K., Hikone (JP); ADVANTEC CO., LTD., Tokyo (JP); TRESSBIO, LLC., Hikone (JP)

(*) Notice: Subject to any disclaimer, the term of this patent is extended or adjusted under 35 U.S.C. 154(b) by 0 days.

(21) Appl. No.: 17/264,100

(22) PCT Filed: Jul. 13, 2020

(86) PCT No.: PCT/JP2020/027280
§ 371 (c)(1),
(2) Date: Jan. 28, 2021

(87) PCT Pub. No.: WO2021/240828
PCT Pub. Date: Dec. 2, 2021

(65) Prior Publication Data
US 2022/0080430 A1    Mar. 17, 2022

(30) Foreign Application Priority Data
May 29, 2020    (JP) .............................. JP2020-093853

(51) Int. Cl.
*B03B 5/28*    (2006.01)
*B03B 9/06*    (2006.01)
(Continued)

(52) U.S. Cl.
CPC .............. *B03B 5/28* (2013.01); *B03B 9/061* (2013.01)

(58) Field of Classification Search
CPC .... B03B 5/28; B03B 5/30; B03B 5/32; B03B 5/34; B03B 9/061
(Continued)

(56) References Cited

U.S. PATENT DOCUMENTS 6,176,376 B1* 1/2001 MacNeil ................. B03B 9/061
                                                       209/159
6,649,203 B1* 11/2003 Thoroski ................. A23L 15/00
                                                       426/299
(Continued)

FOREIGN PATENT DOCUMENTS

CN    103330237 A    * 10/2013
CN    103330237 B     8/2015
(Continued)

OTHER PUBLICATIONS

International Search Report (ISR) dated Sep. 15, 2020, issued for International application No. PCT/JP2020/027280. (3 pages) (Translation).
(Continued)

*Primary Examiner* — Gene O Crawford
*Assistant Examiner* — Muhammad Awais
(74) *Attorney, Agent, or Firm* — Law Office of Katsuhiro Arai

(57) ABSTRACT

An eggshell membrane separation system of separating a broken egg into an eggshell and an eggshell membrane (100) including: a pulverizer (10) that pulverizes the broken egg; an alkaline water tank (20) in which alkaline water is synthesized; and a separation tank (30) in which the alkaline water is supplied from the alkaline water tank and the broken egg pulverized by the pulverizer is separated into the egg-
(Continued)

shell and the eggshell membrane, wherein the alkaline water discharged from the separation tank is returned to the alkaline water tank (20) and reused. The eggshell membrane separation system can improve a separation property of an eggshell and an eggshell membrane and smoothly discharge the eggshell precipitated in the separation tank.

15 Claims, 2 Drawing Sheets

(51) Int. Cl.
*A23L 15/00* (2016.01)
*B03B 5/32* (2006.01)
*B03B 5/66* (2006.01)

(58) Field of Classification Search
USPC .................................................... 209/509
See application file for complete search history.

(56) References Cited

U.S. PATENT DOCUMENTS

| | | | | |
|---|---|---|---|---|
| 7,007,806 | B2* | 3/2006 | MacNeil | B03B 9/061 209/172.5 |
| 7,584,909 | B2* | 9/2009 | Vlad | A23L 15/00 241/23 |
| 8,418,943 | B2* | 4/2013 | DeJong | A23L 15/00 241/1 |
| 9,370,778 | B2* | 6/2016 | Snyder | B02C 19/005 |
| 9,873,616 | B2* | 1/2018 | Toman | A23L 15/00 |
| 2011/0272502 | A1* | 11/2011 | New | B03B 9/061 241/18 |
| 2015/0064084 | A1* | 3/2015 | Kurushima | B01D 53/96 422/4 |

FOREIGN PATENT DOCUMENTS

| | | | | |
|---|---|---|---|---|
| JP | H01275512 | A | | 11/1989 |
| JP | H07227551 | A * | | 8/1995 |
| JP | H08173838 | A | | 7/1996 |
| JP | H1072313 | A | | 3/1998 |
| JP | 2001519712 | A | | 10/2001 |
| JP | 3305538 | B2 * | 7/2002 | ............ B03B 9/061 |
| JP | 3305538 | B2 | | 7/2002 |
| JP | 2011184269 | A | | 9/2011 |
| JP | 2013233120 | A * | | 11/2013 |
| JP | 2013233120 | A | | 11/2013 |
| WO | WO-0166270 | A1 * | 9/2001 | ............ B03B 9/061 |
| WO | WO-2018187868 | A1 * | 10/2018 | ............... A61K 6/17 |

OTHER PUBLICATIONS

International Search Report (ISR) dated Sep. 15, 2020, issued for International application No. PCT/JP2020/027280. (3 pages) (no translation is available).

* cited by examiner (a)

(b)

(c)

EGGSHELL MEMBRANE SEPARATION SYSTEM AND EGGSHELL MEMBRANE SEPARATION METHOD

CROSS-REFERENCE TO RELATED APPLICATIONS

This application is the U.S. National Phase under 35 U.S.C. § 371 of International Application PCT/JP2020/027280, filed Jul. 13, 2020, which claims priority to Japanese Patent Application No. JP2020-093853, filed May 29, 2020. The International Application was published under PCT Article 21(2) in a language other than English.

TECHNICAL FIELD

The present invention relates to an eggshell membrane separation system of separating a broken egg into an eggshell and an eggshell membrane.

BACKGROUND ART

A broken egg after removing egg yolk and egg white is in a state where an eggshell membrane adheres to an eggshell. However, each of the eggshell and eggshell membrane has a utility value and development is being conducted for separating the eggshell and eggshell membrane efficiently.

Patent Literature 1 describes a device that, in order to separate an eggshell and an eggshell membrane, pulverizes with using a centrifugal separator and then separates by utilizing a difference in specific gravity between powder-particles of the pulverized eggshell and the eggshell membrane.

CITATION LIST

Patent Literature

Patent Literature 1: Japanese Patent No. 3305538

SUMMARY OF INVENTION

Problem to be Solved by Invention

However, with the device described in Patent Literature 1, contact resistance between the eggshells and between the eggshell and metal of a separation tank is high, and there are problems that the eggshell and the eggshell membrane may not be separated and could possibly be unable to be discharged while being precipitated in the separation tank.

An object of the present invention is to solve the problems described above to improve a separation property of an eggshell and an eggshell membrane and to smoothly discharge the eggshell precipitated in a separation tank.

Means for Solving Problem

In order to solve the problems described above, the present invention is to provide an eggshell membrane separation system of separating a broken egg into an eggshell and an eggshell membrane, including
a pulverizer that pulverizes the broken egg,
an alkaline water tank in which alkaline water is synthesized, and
a separation tank in which the alkaline water is supplied from the alkaline water tank and the broken egg pulverized by the pulverizer is separated into the eggshell and the eggshell membrane, characterized in that
the alkaline water discharged from the separation tank is returned to the alkaline water tank and reused.

With this configuration, by supplying the alkaline water to the separation tank in which the eggshell and the eggshell membrane are separated, due to a surface activation ability of the alkaline water, it is possible to improve a separation property of the eggshell and the eggshell membrane and to smoothly discharge the eggshell precipitated in the separation tank.

It is also possible to separate the eggshell and the eggshell membrane without consuming the alkaline water.

In the eggshell membrane separation system, the separation tank may include an alkaline water supply nozzle that generates a water vortex by the alkaline water supplied from the alkaline water tank, and an agitation blade provided in a leading end portion of a perpendicular agitation shaft in order to agitate the alkaline water in the tank.

With this configuration, it is possible to efficiently separate the broken egg into the eggshell and the eggshell membrane.

In the eggshell membrane separation system, the eggshell separated in the separation tank may be discharged from a lower end portion of the separation tank by free fall, and the eggshell membrane separated in the separation tank may be discharged from an eggshell membrane discharge port via an eggshell membrane discharge water passage provided in an upper portion in the separation tank.

With this configuration, the eggshell separated in the separation tank is discharged from the lower end portion of the separation tank together with the alkaline water by free fall. Thus, it is possible to smoothly discharge the eggshell precipitated in the separation tank and to smoothly discharge the eggshell membrane having light specific gravity from the eggshell membrane discharge port of the upper portion.

In the eggshell membrane separation system, the eggshell membrane discharge water passage may be slightly tilted with respect to a horizontal plane so that a position where the eggshell membrane discharge port is provided becomes high.

With this configuration, the eggshell slipping into the eggshell membrane discharge water passage is precipitated in the separation tank by the specific gravity. Thus, it is possible to prevent the eggshell form being discharged from the eggshell membrane discharge port.

In the eggshell membrane separation system, in the alkaline water tank, alkaline water may be synthesized from calcium hydroxide obtained by processing the eggshell and water.

With this configuration, by processing the eggshell and synthesizing the alkaline water, it is possible to effectively utilize a material and also to make a safe and secure eggshell membrane separation system.

In the eggshell membrane separation system, the pulverizer may be formed by a centrifugal separator.

With this configuration, it is possible to pulverize the broken egg so that moisture is not contained as much as possible.

In order to solve the problems described above, the present invention is to provide an eggshell membrane separation method of separating a broken egg into an eggshell and an eggshell membrane, characterized by including
a pulverization step of pulverizing the eggshell,
an alkaline water synthesis step of synthesizing alkaline water, a separation step of supplying the alkaline water synthesized in the alkaline water synthesis step and separating the broken egg pulverized in the pulverization step into the eggshell and the eggshell membrane, and an alkaline water reuse step of reusing the alkaline water used in the separation step.

With this configuration, by supplying the alkaline water to the separation tank in which the eggshell and the eggshell membrane are separated, due to a surface activation ability of the alkaline water, it is possible to improve a separation property of the eggshell and the eggshell membrane and to smoothly discharge the eggshell precipitated in the separation tank.

It is also possible to separate the eggshell and the eggshell membrane without consuming the alkaline water.

Effect of Invention

With the eggshell membrane separation system of the present invention, it is possible to improve the separation property of the eggshell and the eggshell membrane and to smoothly discharge the eggshell precipitated in the separation tank.

MODE FOR CARRYING OUT INVENTION

First Embodiment

Figure 1:
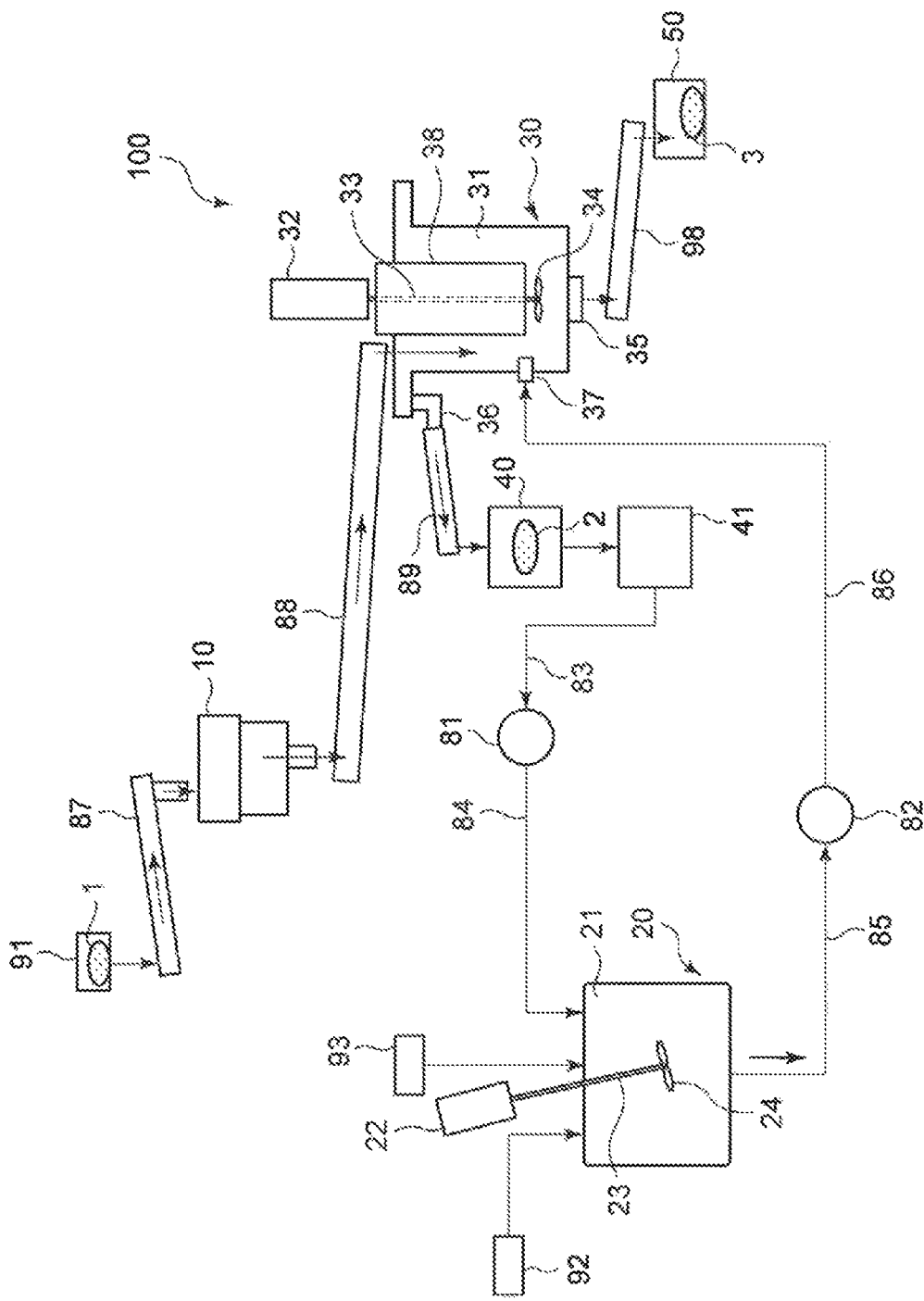
FIG. 1 is a diagram for explaining an eggshell membrane separation system in a first embodiment of the present invention.
Figure 2:
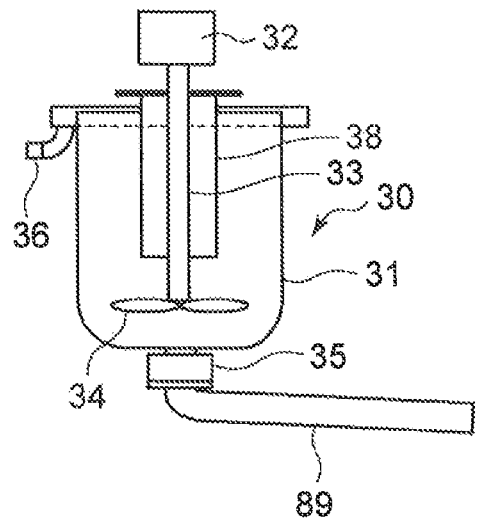
FIG. 2 is a diagram for explaining a separation tank in the first embodiment of the present invention.
Figure 2:
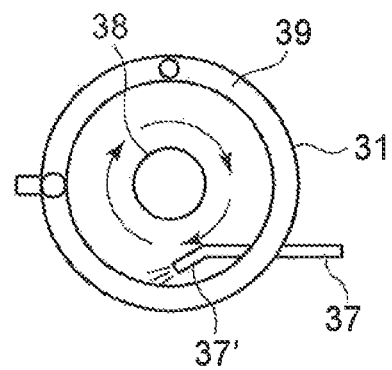
Figure 2:
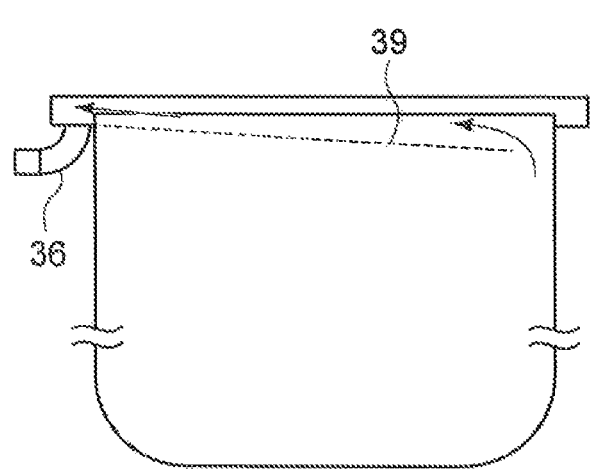

A first embodiment of the present invention will be described with reference to FIGS. 1 and 2. FIG. 1 is a diagram for explaining an eggshell membrane separation system in the first embodiment of the present invention. FIG. 2 is a diagram for explaining a separation tank in the first embodiment of the present invention.

(Eggshell Membrane Separation System)

An eggshell membrane separation system 100 in the first embodiment is to separate an inputted broken egg 1 into an eggshell membrane 2 and an eggshell 3, and includes a pulverizer 10, an alkaline water tank 20, a separation tank 30, an eggshell membrane gathering basket 40, and an eggshell gathering basket 50.

The broken egg 1 from which egg yolk and egg white are already removed is inputted from a broken egg supply port 91, conveyed by a broken egg supply conveyor 87, and supplied to the pulverizer 10. The pulverizer 10 in the first embodiment is formed by a centrifugal separator, and the supplied broken egg 1 is pulverized to approximately 5 mm$^\square$. By forming the pulverizer 10 by the centrifugal separator, moisture is separated. Thus, when alkaline water to be described later is inputted, the alkaline water is not diluted.

Although the pulverizer 10 in the first embodiment is formed by the centrifugal separator, the present invention is not necessarily limited to this but can be changed appropriately. For example, the pulverizer may be an agitation type pulverizer or any other arbitrary pulverizers.

The pulverized eggshell is conveyed by a pulverized eggshell supply conveyor 88 and supplied to the separation tank 30. The separation tank 30 in the first embodiment has a substantially cylindrical separation tank body 31 having the volume of 1.5 m$^3$, an agitation blade 34 that agitates near a bottom portion in the separation tank body 31, an agitation motor 32 that rotates this agitation blade 34, an agitation shaft 33 that transmits rotation force of the agitation motor 32 to the agitation blade 34, a diffusion pipe 38, an alkaline water supply port 37 from which the alkaline water is supplied to the separation tank 30, an eggshell membrane discharge port 36 from which the separated eggshell membrane 2 is discharged to the outside together with the alkaline water, and an eggshell discharge port 35 from which the separated eggshell 3 is discharged to the outside together with the alkaline water. The agitation shaft 33 is provided perpendicularly from the agitation motor 32 to the agitation blade 34, and the agitation blade 34 is provided at right angle to the agitation shaft 33, that is, provided horizontally. By providing the agitation shaft 33 perpendicularly and providing the agitation blade 34 horizontally, agitation force does not become stronger than necessary. When the agitation force becomes too strong, the eggshell 3 precipitated in the separation tank body 31 could possibly fly up and mix into the eggshell membrane 2 which has already gone up.

The diffusion pipe 38 has a cylindrical shape and is provided perpendicularly in a center portion of the separation tank body 31 on the upper side of the agitation blade 34. The agitation shaft 33 described above is contactlessly provided in a center portion of the diffusion pipe 38. By providing the diffusion pipe 38, a large vortex is suppressed from being generated in the center portion inside the separation tank body 31, and the separated eggshell membrane 2 is prevented from being gathered at vortex center. When the separated eggshell membrane 2 is gathered at the vortex center, an amount of the eggshell membrane 2 coming out to an eggshell membrane water passage 39 to be described later is reduced, and the eggshell membrane is less easily discharged to the outside.

The alkaline supply port 37 is provided in a lower portion of the separation tank body 31, and as shown in FIG. 2, has a nozzle 37' that injects the alkaline water toward an inner wall of the separation tank body 31. The alkaline water injected from this nozzle 37' generates a water flow along the inner wall of the separation tank body 31, and agitates the pulverized broken egg 1 in the alkaline water together with the agitation blade 34. By being agitated, the broken egg 1 is more easily separated into the eggshell membrane 2 and the eggshell 3. The eggshell membrane 2 having light specific gravity floats up and the eggshell 3 having heavy specific gravity is precipitated.

The floating eggshell membrane 2 is led by the water flow to the eggshell membrane water passage 39 provided along the inner wall of an upper portion in the separation tank body 31 and brought close to the eggshell membrane discharge port 36. The eggshell membrane water passage 39 is provided to be slightly tilted with respect to a horizontal plane to go up toward the eggshell membrane discharge port 36 from the opposite side of the eggshell membrane discharge port 36. Thereby, the eggshell 3 brought into the eggshell membrane water passage 39 by error is precipitated to the lower portion of the separation tank body 31 and prevented from going to the eggshell membrane discharge port 36. The eggshell membrane 2 reaching the eggshell membrane discharge port 36 is discharged to the outside together with the alkaline water.

The eggshell 3 separated and precipitated in the separation tank body 31 is discharged to the outside from the eggshell discharge port 35 provided on a bottom surface of the separation tank body 31 together with the alkaline water by free fall. By discharging the eggshell 3 from the eggshell discharge port 35 provided on the bottom surface of the separation tank body 31 by free fall, the discharge port and tubes are less easily clogged. If a discharge port for the eggshell is provided in an upper portion of the separation tank body 31, subsequent tubes could possibly be clogged.

By separating the broken egg 1 into the eggshell membrane 2 and the eggshell 3 in the alkaline water, due to a surface activation ability of the alkaline water, it is possible to improve a separation property of the eggshell and the eggshell membrane and to smoothly discharge the eggshell precipitated in the separation tank.

The separated eggshell 3 discharged from the eggshell discharge port 35 by free fall is carried by an eggshell discharge bucket 98 and discharged to and accumulated in the eggshell gathering basket 50 formed by a net. The alkaline water discharged together is discharged to a water passage (not shown) from the eggshell gathering basket 50. However, as described later, the alkaline water from which dirt is removed may be returned to the alkaline water tank 20 and reused.

In order not to clog the separated eggshell 3 discharged from the eggshell discharge port 35 by free fall but more easily carry the eggshell by the eggshell discharge bucket 98, supplemental water may be carried by the eggshell discharge bucket 98.

The separated eggshell membrane 2 discharged from the eggshell membrane discharge port 36 is conveyed by an eggshell membrane discharge conveyor 89 and gathered by the eggshell membrane gathering basket 40. Dirt such as eggshell powder of the alkaline water discharged together is precipitated in a precipitation tank 41 and hence removed, and as described later, only the alkaline water is stored again in the alkaline water tank 20 and reused. Thereby, it is possible to use the alkaline water without consuming.

The alkaline water tank 20 is to synthesize the alkaline water from water and calcium hydroxide. That is, by supplying water to a substantially cylindrical water tank body 21 from a water supply port 93, supplying calcium hydroxide from a calcium hydroxide supply port 92, and rotating an agitation blade 24 in the water tank body 21 to agitate, the alkaline water is synthesized. An alkaline property of the alkaline water is preferably pH 11 or more, and more preferably pH 12.4. By burning the eggshell at approximately 1,000° C. and then adding water to make calcium hydroxide $Ca(OH)^2$, safe and secure alkaline water is synthesized at low cost. The agitation blade 24 is provided in a leading end of an agitation shaft 23 slightly tilted with respect to perpendicularity. By rotating an agitation motor 22 provided in the other leading end of the agitation shaft 23, the agitation blade 24 is rotated in a state where the agitation blade is slightly tilted with respect to horizontality, so that strong agitation force can be obtained.

The synthesized alkaline water reaches a magnet pump 82 via an alkaline water supply tube 85, and is further supplied into the separation tank body 31 from the alkaline water supply port 37 of the separation tank 30 via an alkaline water supply tube 86. The pump for supplying the alkaline water is a pump capable of supplying the alkaline water by approximately 100 liter/min at minimum. In order to precisely control a flow rate, the pump is the magnet pump 82 in which no air is added. However, the present invention is not limited to this but can be changed appropriately. For example, the pump may be an arbitrary pump such as a diaphragm pump.

The alkaline water recovered from the precipitation tank 41 is returned to the alkaline water tank 20 via an alkaline water reuse tube 83, a diaphragm pump 81, and an alkaline water reuse tube 84 for reuse. By using the diaphragm pump 81 capable of feeding water even when air entrainment occurs as the pump for returning the alkaline water, it is possible to smoothly return the alkaline water.

In the first embodiment, the alkaline water recovered from the precipitation tank 41 is returned to the alkaline water tank 20 via the alkaline water reuse tube 83, the diaphragm pump 81, and the alkaline water reuse tube 84. However, the present invention is not necessarily limited to this but can be changed appropriately. For example, the alkaline water may be returned to the alkaline water tank 20 directly from the precipitation tank 41 not via the alkaline water reuse tubes, etc. The alkaline water may be returned to the alkaline water tank 20 directly from the alkaline water reuse tube 83 without using the diaphragm pump 81.

(Eggshell Membrane Separation Method)

Next, an eggshell membrane separation method will be described. First of all, a pulverization step of pulverizing the broken egg 1 from which egg yolk and egg white are removed to approximately 5 mm□ by the pulverizer 10 is conducted. By pulverizing to approximately 5 mm□, it is possible to more easily separate the eggshell membrane and the eggshell.

A separation step is conducted to separate the broken egg 1 pulverized in the pulverization step into the eggshell membrane 2 and the eggshell 3. In the separation step, the alkaline water more than height of the pulverized broken egg 1 supplied to the separation tank 30 is supplied and agitated. Thereby, the broken egg 1 is separated into the eggshell membrane 2 and the eggshell 3, the eggshell membrane 2 having light specific gravity floats up, and the eggshell 3 having heavy specific gravity is precipitated. At this time, the eggshell membrane 2 is not gathered at the center by agitation but discharged from the eggshell membrane discharge port 36 while going up along the eggshell membrane water passage 39 slightly tilted so that the eggshell 3 does not mix in. The eggshell 3 is discharged from the eggshell discharge port from the bottom surface of the separation tank body 31 by free fall so that the tubes are not clogged.

By separating the broken egg 1 into the eggshell membrane 2 and the eggshell 3 in the alkaline water, due to the surface activation ability of the alkaline water, it is possible to improve the separation property of the eggshell and the eggshell membrane and to smoothly discharge the eggshell precipitated in the separation tank.

Regarding the alkaline water to be supplied to the separation tank 30, an alkaline water synthesis step of synthesizing the alkaline water from water and calcium hydroxide in the alkaline water tank 20 is conducted before the separation step. Calcium hydroxide to be used in the alkaline water synthesis step is prepared in advance by processing the eggshell.

Regarding the alkaline water used in the separation tank 30 and discharged together with the eggshell membrane 2, after removing dirt, an alkaline water reuse step of returning the alkaline water to the alkaline water tank 20 and reusing is conducted.

In such a way, in the first embodiment, with the eggshell membrane separation system of separating the broken egg into the eggshell and the eggshell membrane, including the pulverizer that pulverizes the broken egg, the alkaline water tank in which the alkaline water is synthesized, and the separation tank in which the alkaline water is supplied from the alkaline water tank and the broken egg pulverized by the pulverizer is separated into the eggshell and the eggshell membrane, characterized in that the alkaline water discharged from the separation tank is returned to the alkaline water tank and reused, by supplying the alkaline water to the separation tank in which the eggshell and the eggshell membrane are separated, due to the surface activation ability of the alkaline water, it is possible to improve the separation property of the eggshell and the eggshell membrane and to smoothly discharge the eggshell precipitated in the separation tank.

It is also possible to separate the eggshell and the eggshell membrane without consuming the alkaline water.

With the eggshell membrane separation method of separating the broken egg into the eggshell and the eggshell membrane, characterized by including the pulverization step of pulverizing the eggshell, the alkaline water synthesis step of synthesizing alkaline water, the separation step of supplying the alkaline water synthesized in the alkaline water synthesis step and separating the broken egg pulverized in the pulverization step into the eggshell and the eggshell membrane, and the alkaline water reuse step of reusing the alkaline water used in the separation step, by supplying the alkaline water to the separation tank in which the eggshell and the eggshell membrane are separated, due to the surface activation ability of the alkaline water, it is possible to improve the separation property of the eggshell and the eggshell membrane and to smoothly discharge the eggshell precipitated in the separation tank.

It is also possible to separate the eggshell and the eggshell membrane without consuming the alkaline water.

INDUSTRIAL APPLICABILITY

The eggshell membrane separation system and the eggshell membrane separation method in the present invention can be widely used in the fields in which an eggshell and an eggshell membrane are utilized.

EXPLANATION OF REFERENCE SIGNS

1: Broken egg
2: Eggshell membrane
3: Eggshell
10: Pulverizer
20: Alkaline water tank
21: Water tank body
22: Agitation motor
23: Agitation shaft
24: Agitation blade
30: Separation tank
31: Separation tank body
32: Agitation motor
33: Agitation shaft
34: Agitation blade
35: Eggshell discharge port
36: Eggshell membrane discharge port
37: Alkaline water supply port
38: Diffusion pipe
39: Eggshell membrane water passage
40: Eggshell membrane gathering basket
41: Precipitation tank
50: Eggshell gathering basket
81: Diaphragm pump
82: Magnet pump
83: Alkaline water reuse tube
84: Alkaline water reuse tube
85: Alkaline water supply tube
86: Alkaline water supply tube
87: Broken egg supply conveyor
88: Pulverized eggshell supply conveyor
89: Eggshell membrane discharge conveyor
91: Broken egg supply port
92: Calcium hydroxide supply port
93: Water supply port
98: Eggshell discharge bucket
100: Eggshell membrane separation system

The invention claimed is:

1. An eggshell membrane separation system of separating a broken egg into an eggshell and an eggshell membrane, comprising:

a pulverizer that pulverizes the broken egg;

an alkaline water tank in which alkaline water is synthesized; and a separation tank in which the alkaline water is supplied from the alkaline water tank and the broken egg pulverized by the pulverizer is separated into the eggshell and the eggshell membrane, characterized in that the alkaline water discharged from the separation tank is returned to the alkaline water tank and reused, and the separation tank includes an alkaline water supply nozzle that generates a water vortex by the alkaline water supplied from the alkaline water tank, and an agitation blade provided in a leading end portion of a perpendicular agitation shaft in order to agitate the alkaline water in the tank.

2. An eggshell membrane separation system of separating a broken egg into an eggshell and an eggshell membrane, comprising:

a pulverizer that pulverizes the broken egg;

an alkaline water tank in which alkaline water is synthesized; and a separation tank in which the alkaline water is supplied from the alkaline water tank and the broken egg pulverized by the pulverizer is separated into the eggshell and the eggshell membrane, characterized in that the alkaline water discharged from the separation tank is returned to the alkaline water tank and reused, the eggshell separated in the separation tank is discharged from a lower end portion of the separation tank by free fall, the eggshell membrane separated in the separation tank is discharged from an eggshell membrane discharge port via an eggshell membrane discharge water passage provided in an upper portion in the separation tank, and the eggshell membrane discharge water passage is slightly tilted with respect to a horizontal plane to go up toward the eggshell membrane discharge port.

3. An eggshell membrane separation system of separating a broken egg into an eggshell and an eggshell membrane, comprising:

a pulverizer that pulverizes the broken egg;

an alkaline water tank in which alkaline water is synthesized; and a separation tank in which the alkaline water is supplied from the alkaline water tank and the broken egg pulverized by the pulverizer is separated into the eggshell and the eggshell membrane, characterized in that the alkaline water discharged from the separation tank is returned to the alkaline water tank and reused, and in the alkaline water tank, alkaline water is synthesized from calcium hydroxide obtained by processing the eggshell and water.

4. The eggshell membrane separation system according to claim 1, characterized in that
the pulverizer is formed by a centrifugal separator.

5. An eggshell membrane separation method of separating a broken egg into an eggshell and an eggshell membrane, characterized by comprising:
a pulverization step of pulverizing the broken egg;
an alkaline water synthesis step of synthesizing alkaline water;
a separation step of supplying the alkaline water synthesized in the alkaline water synthesis step and separating the broken egg pulverized in the pulverization step into the eggshell and the eggshell membrane; and
an alkaline water reuse step of reusing the alkaline water used in the separation step, wherein, in the alkaline water synthesis step, alkaline water is synthesized from calcium hydroxide obtained by processing the eggshell and water.

6. The eggshell membrane separation system according to claim 1, characterized in that
the eggshell separated in the separation tank is discharged from a lower end portion of the separation tank by free fall, and
the eggshell membrane separated in the separation tank is discharged from an eggshell membrane discharge port via an eggshell membrane discharge water passage provided in an upper portion in the separation tank.

7. The eggshell membrane separation system according to claim 1, characterized in that
in the alkaline water tank, alkaline water is synthesized from calcium hydroxide obtained by processing the eggshell and water.

8. The eggshell membrane separation system according to claim 2, characterized in that
in the alkaline water tank, alkaline water is synthesized from calcium hydroxide obtained by processing the eggshell and water.

9. The eggshell membrane separation system according to claim 2, characterized in that
the pulverizer is formed by a centrifugal separator.

10. The eggshell membrane separation system according to claim 3, characterized in that
the pulverizer is formed by a centrifugal separator.

11. The eggshell membrane separation system according to claim 6, characterized in that
the eggshell membrane discharge water passage is slightly tilted with respect to a horizontal plane to go up toward the eggshell membrane discharge port.

12. The eggshell membrane separation system according to claim 6, characterized in that
in the alkaline water tank, alkaline water is synthesized from calcium hydroxide obtained by processing the eggshell and water.

13. The eggshell membrane separation system according to claim 6, characterized in that
the pulverizer is formed by a centrifugal separator.

14. The eggshell membrane separation system according to claim 7, characterized in that
the pulverizer is formed by a centrifugal separator.

15. The eggshell membrane separation system according to claim 8, characterized in that
the pulverizer is formed by a centrifugal separator.

* * * * *